Oct. 3, 1961

W. H. NEWELL ET AL 3,002,691

ANALOG CONVERTER

Filed Aug. 12, 1957

3 Sheets-Sheet 1

INVENTORS
WILLIAM H. NEWELL
HENRY F. McKENNEY
NORMAN J. ZABB

BY Victor S. Borst

ATTORNEY

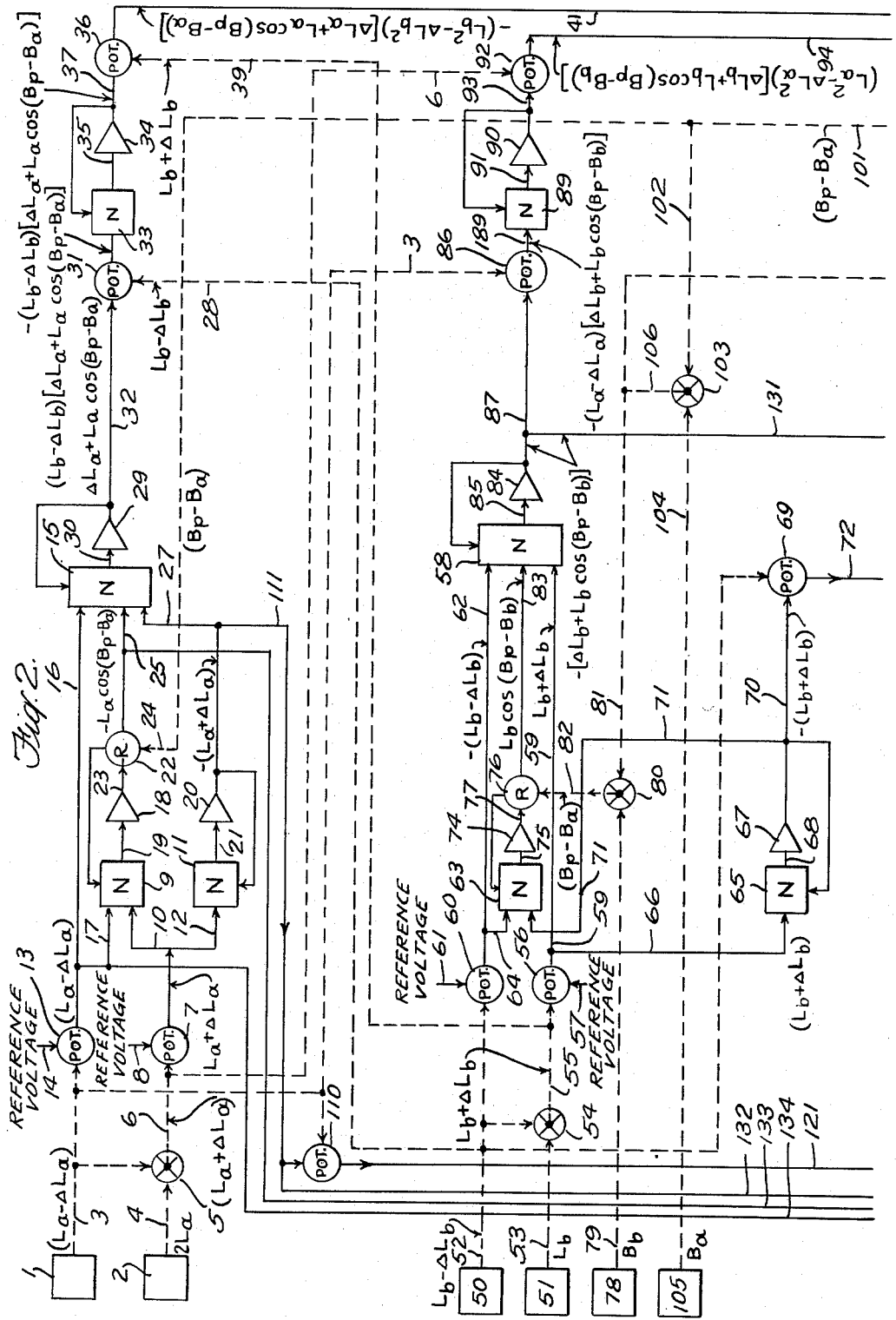

INVENTORS
WILLIAM H. NEWELL
HENRY F. MCKENNEY
NORMAN J. ZABB.

BY Victor D. Borst

ATTORNEY

United States Patent Office 3,002,691
Patented Oct. 3, 1961

3,002,691
ANALOG CONVERTER
William H. Newell, Mount Vernon, N.Y., Henry F. McKenney, Weston, Mass., and Norman J. Zabb, Brooklyn, N.Y., assignors to Sperry Rand Corporation, Ford Instrument Company Division, Long Island City, N.Y., a corporation of Delaware
Filed Aug. 12, 1957, Ser. No. 678,264
3 Claims. (Cl. 235—187)

This invention relates to three-station navigational systems and has for its principal object that of providing an automatic device for accurately converting plane hyperbolic coordinates to plane rectangular coordinates.

Among conventional systems which provide plane hyperbolic coordinates of a position are three-station-radio-phase-comparison-systems for determining the geographic position of vehicles having an altitude small in comparison with its distance from the ground stations. Such vehicles may be ships, low, and moderately low, flying aircraft and guided missiles.

In the present state of the art, the conversion of plane hyperbolic coordinates to plane rectangular coordinates is laborious even with the aid of charts and maps. An automatic device which provides a virtually instantaneous conversion of the input data will have the following advantages: conservation of human resources, elimination of human error, continuous output data and the availability of solution quantities as rectangular coordinates in a physical analog form which are suitable for additional automatic computation. However, such an automatic device will have limited value and application unless it has a high order of precision.

In general, the invention contemplates analog instrumentation which responds to newly derived mathematics for the conversion of hyperbolic coordinates to plane rectangular coordinates and additionally, which reduces errors in the polar distance due to small unavoidable errors in polar bearing. The embodiments of the invention will comprise combinations of potentiometers, resolvers, adding networks, amplifiers and closed loop servomechanism systems.

Figure 1:
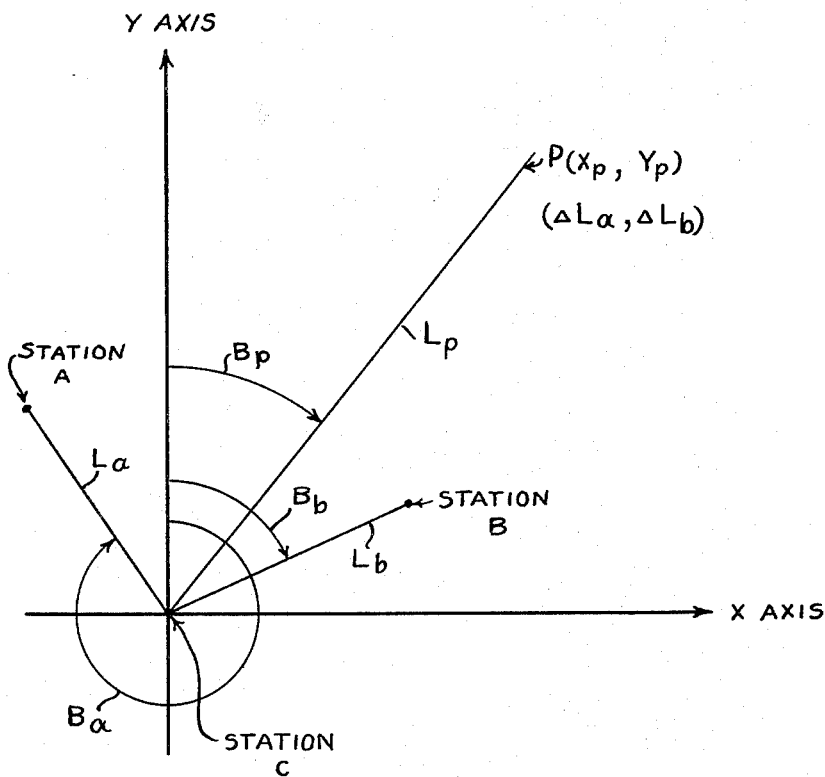
Figure 2A:
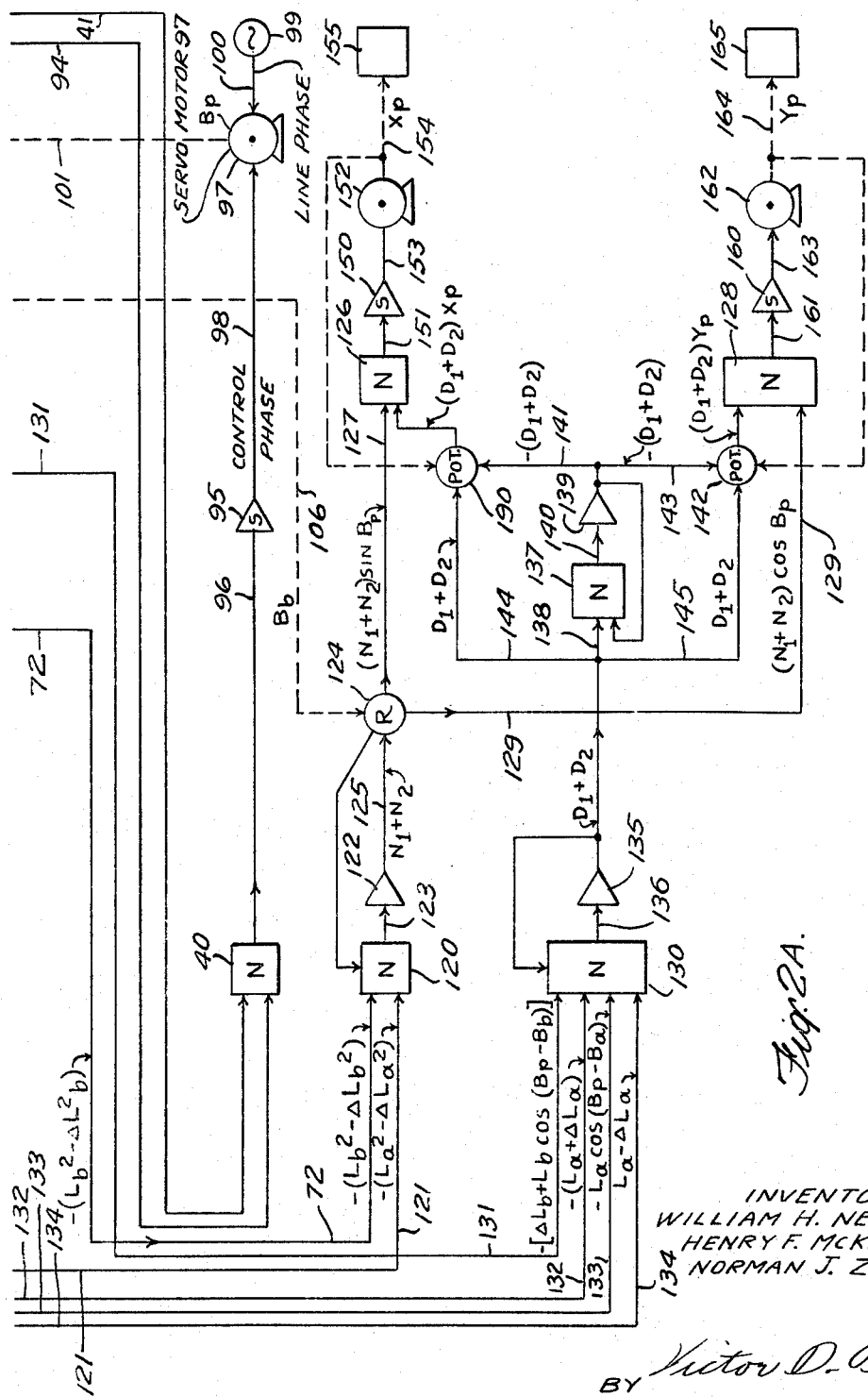

The features of the invention will be understood more clearly from the following detailed description taken in conjunction with the accompanying drawings in which:

FIG. 1 is a plane representation of a vehicle position relative to three reference station transmitters; and FIGS. 2 and 2A are a schematic diagram of an analog device for automatically converting hyperbolic coordinates to rectangular coordinates.

Referring to the plane diagram in FIG. 1, point P is the location of a vehicle having plane hyperbolic coordinates $\Delta L_a$ and $\Delta L_b$ relative to transmitters located at three points A, C and B, the altitude of the vehicle being small compared to its distance from the points A, C and B. The point P has plane rectangular coordinates $X_p$ along the X axis and $Y_p$ along the Y axis in a system of convenient rectangular coordinates having its origin at the point C. The base line distance C to A is designated $L_a$ and the base line distance C to B is designated $L_b$. The bearing of base line CA relative to the Y axis is designated $B_a$, the bearing of the base line CB relative to the Y axis is designated $B_b$, the bearing of the vehicle at P from the Y axis is designated $B_p$ and its polar distance from the point C is designated $L_p$. The hyperbolic coordinates $\Delta L_a$ and $\Delta L_b$ are defined as $(L_a-L_p)$ and $(L_b-L_p)$, respectively, and these quantities are provided in the vehicle by a conventional arrangement of local receivers and phase comparators. From equipment located in the vehicle at the point P, the embodiments of this invention will continuously and automatically provide the rectangular coordinates $X_p$ and $Y_p$ for known input data of $\Delta L_a$, $\Delta L_b$, $L_a$, $L_b$, $B_a$ and $B_b$.

For a three-station navigational system employing three ground station transmitters to provide hyperbolic coordinates of the relative vehicle position from local receivers and phase comparators, the mathematical conversion of plane hyperbolic coordinates to equivalent plane rectangular coordinates can be effected by the application of the following mathematically derived formulae:

$$L_p = \frac{L_a^2 - \Delta L_a^2}{2[\Delta L_a + L_a \cos (B_p - B_a)]} \quad (1)$$

and;

$$L_p = \frac{L_b^2 - \Delta L_b^2}{2[\Delta L_b + L_b \cos (B_p - B_b)]} \quad (2)$$

A simultaneous solution of the two formulae with known values of $B_a$, $B_b$, $L_a$, $L_b$, $\Delta L_a$, and $\Delta L_b$, will yield values of $L_p$ and $B_p$. The plane rectangular coordinates $X_p$ and $Y_p$ of the vehicle relative to the central station can then be computed from the formulae:

$$X_p = L_p \sin B_p \quad (3)$$
$$Y_p = L_p \cos B_p \quad (4)$$

In the solution of Equations 1 and 2, the bearing $B_p$ of the vehicle at point P is made available from the solution of the following equation:

$$\frac{L_a^2 - \Delta L_a^2}{2[\Delta L_a + L_a \cos (B_p - B_a)]} = \frac{L_b^2 - \Delta L_b^2}{2[\Delta L_b + L_a \cos (B_p - B_a)]} \quad (5)$$

It will be noted that after the value $B_p$ is determined by equating Equations 1 and 2, the value $L_p$ may be obtained from either Equation 1, Equation 2, or from some combination thereof. The method selected for determining $L_p$ should be one which is comparatively insensitive to errors in $B_p$, the latter being unavoidably introduced during any physical calculation of $B_p$.

Specifically, for a good order of precision when a bearing error $\Delta B_p$ is unavoidably introduced, the resulting computed radial error $$\frac{\partial L_p}{\partial B_p} \Delta B_p$$

(approximate) should not exceed the order of magnitude of the inherent tangential error $L_p \Delta B_p$ (approximate) so that the total error E as determined by:

$$E = \sqrt{\left(\frac{\partial L_p}{\partial B_p} \Delta B_p\right)^2 + (L_p \Delta B_p)^2} \quad (6)$$

shall not greatly exceed the inherent tangential error.

The figure of merit which characterizes the accuracy of the calculation of $L_p$ is defined by the quantity S which is equal to:

$$S = \frac{E}{L_p \Delta B_p} \quad (7)$$

From Equations 6 and 7, it can be seen that:

$$S = \sqrt{1 + \left(\frac{1}{L_p} \cdot \frac{\partial L_p}{\partial B_p}\right)^2} \quad (8)$$

An analysis by partial differentiation of the Formulae 1 and 2 to provide, in each case, the radial sensitivity $$\frac{\partial L_p}{\partial B_p}$$

indicates that for most of the expected configurations of the vehicle and the three stations, A, B and C, the radial error $$\frac{\partial L_p}{\partial B_p} \Delta B_p$$

resulting from employing Formula 1 to obtain $L_p$ is approximately equal to and opposite in sign to the error resulting from employing Formula 2.

Hence, an improvement in the accuracy of the converter can be effected by determining $L_p$ not from either Equation 1 or 2 alone, but instead from a combination of Equations 1 and 2 which tends to cancel out the radial error of each. This combination equation may be written as:

$$L_p = \frac{N_1 + N_2}{D_1 + D_2} \quad (9)$$

wherein, $N_1$, $N_2$, $D_1$, $D_2$ are respectively the numerators and denominators of Equations 1 and 2, i.e., $$N_1 = L_a^2 - \Delta L_a^2 \quad (10)$$

$$D_1 = 2[\Delta L_a + L_a \cos(B_p - B_a)] \quad (11)$$

$$N_2 = L_b^2 - \Delta L_b^2 \quad (12)$$

$$D_2 = 2[\Delta L_b + L_b \cos(B_p - B_b)] \quad (13)$$

Combining Equations 3, 4, and 9 yields $$X_p = \frac{(N_1 + N_2)}{(D_1 + D_2)} \sin B_p = L_p \sin B_p \quad (14)$$

$$Y_p = \frac{(N_1 + N_2)}{(D_1 + D_2)} \cos B_p = L_p \cos B_p \quad (15)$$

For the above reasons, in the embodiments of this invention, an average will be effected of the numerators and denominators of Equations 1 and 2 as indicated by the Formulas 14 and 15 so as to compute $L_p$ with a greatly reduced value of radial sensitivity. Such averaging introduces no new errors.

The error factor $$\frac{1}{L_p} \frac{\partial L_p}{\partial B_p}$$

can be mathematically determined for the employed solution by taking partial derivatives of Equation 9, i.e., $$L_p = \frac{L_a^2 - \Delta L_a^2 + L_b^2 - \Delta L_b^2}{2[\Delta L_a + L_a \cos(B_p - B_a) + \Delta L_b + L_b \cos(B_p - B_b)]} \quad (16)$$

thus;

$$\frac{\partial L_p}{\partial B_p}$$

$$= \frac{(L_a^2 - \Delta L_a^2 + L_b^2 - \Delta L_b^2)L_a \sin(B_p - B_a) + L_b \sin(B_p - B_b)}{2[\Delta L_a + L_a \cos(B_p - B_a) + \Delta L_b + L_b \cos(B_p - B_b)]^2} \quad (17)$$

From Equation 9:

$$\frac{2L_p^2}{L_a^2 - \Delta L_a^2 + L_b^2 - \Delta L_b^2}$$

$$= \frac{L_a^2 - \Delta L_a^2 + L_b^2 - \Delta L_b^2}{2[\Delta L_a + L_a \cos(B_p - B_a) + \Delta L_b + L_b \cos(B_p - B_b)]^2} \quad (18)$$

Substituting in Equation 17 and dividing by $L_p$ $$\frac{1}{L_p} \frac{\partial L_p}{\partial B_p} = \frac{2L_p[L_a \sin(B_p - B_a) + L_b \sin(B_p - B_b)]}{L_a^2 - \Delta L_a^2 + L_b^2 - \Delta L_b^2} \quad (19)$$

To demonstrate the reduced error consider a straight-line station configuration of points A, B and C, then $$B_p - B_a = B_p - B_b \pm \pi \sin(B_p - B_a) = -\sin(B_p - B_b) \quad (20)$$

Hence for a straight line configuration, the formula becomes, $$\frac{1}{L_p} \frac{\partial L_p}{\partial B_p} = (L_a - L_b)\left[\frac{2L_p \sin(B_p - B_a)}{L_a^2 - \Delta L_a^2 + L_b^2 - \Delta L_b^2}\right] \quad (21)$$

Now, if $L_a = L_b$ $$\frac{1}{L_p} \frac{\partial L_p}{\partial B_p} = 0$$

and, $$S = \sqrt{1 + \left(\frac{1}{L_p} \frac{\partial L_p}{\partial B_p}\right)^2} = 1$$

Consequently, for nearly equal base lengths and an approximately straight-line station configuration, the total sensitivity S is of a very good order, that is, very near unity.

Referring to the analog coordinate converter of FIG. 2, driving devices 1 and 2 turn shafts 3 and 4 in direct proportion to input data $(L_a - \Delta L_a)$ and $2L_a$, respectively. Shafts 3 and 4 are connected to the two input shafts of a mechanical differential 5. The differential output shaft 6 containing the information $(L_a + \Delta L_a)$ is connected to the shaft of a potentiometer 7 having a reference voltage input 8. The output from the potentiometer 7 containing the information $(L_a + \Delta L_a)$ is connected to one of the two inputs of a adding network 9 by a cable 10 and to the input of a adding network 11 by a cable 12, respectively. The shaft 3 is also connected to the shaft of a potentiometer 13 having an input reference voltage 14. The output of the potentiometer 13 containing the information $(L_a - \Delta L_a)$ is connected to the first input of a three-input adding network 15 by a cable 16 and to the second input of the adding network 9 by a cable 17. The output of the adding network 9 is connected to the input of an amplifier 18 by a cable 19 and the output of the network 11 is connected to an amplifier 20 by a cable 21. The output of the amplifier 18 is connected to the input of a cosine resolver 22 by a cable 23 and the shaft of the resolver 22 is connected to a shaft 24 which is displaced in proportion to the quantity $(B_p - B_a)$, the instrumentation for the shaft 24 being disclosed later. The output of resolver 22 containing the information $-L_a \cos(B_p - B_a)$ is connected to the second input of the adding network 15 by a cable 25. A portion of the output of the resolver 22 is fed back to the network 9 for stabilization purposes. The output of the amplifier 20 containing the information $-(L_a + \Delta L_a)$ is connected to the third input of adding network 15 by a cable 27. A portion of the output of the amplifier 20 is fed back to the adding network 11 for stabilization purposes. The output of adding network 15 is connected to the input of an amplifier 29 by a cable 30 and the output of the amplifier 29 containing the information $\Delta L_a + L_a \cos(B_p - B_a)$ is connected to the input of a potentiometer 31 by a cable 32. A portion of the output of the amplifier 29 is fed back to the adding network 15 for stabilization purposes. The shaft of the potentiometer 31 is displaced by a shaft 28 in proportion to the quantity $(L_b - \Delta L_b)$, the instrumentation for the shaft 28 being disclosed later. The output of the potentiometer 31 containing the information $$(L_b - \Delta L_b)[\Delta L_a + L_a \cos(B_p - B_a)]$$

is connected to the input of an amplifier 34 by a cable 35 and the output of the amplifier 34 containing the information $-(L_b - \Delta L_b)[\Delta L_a + L_a \cos(B_p - B_a)]$ is connected to the input of a potentiometer 36 by a cable 37. A portion of the output of the amplifier 34 is fed back to the adding network 33 for stabilization purposes. The shaft of the potentiometer 36 is displaced by a shaft 39 in proportion to the quantity $(L_b + \Delta L_b)$, the instrumentation of the shaft 39 being disclosed later. The output of the potentiometer 36 containing the information $$-(L_b^2 - \Delta L_b^2)[\Delta L_a + L_a \cos(B_p - B_a)]$$

is connected to one input of a adding network 40 by a cable 41.

Driving devices 50 and 51 turn shafts 52 and 53 in direct proportion to the input quantities $(L_b - \Delta L_b)$ and $L_b$ respectively. The shafts 52 and 53 drive the two input shafts of a mechanical differential 54 and the differential output shaft 55 of the differential 54 containing the information $(L_b + \Delta L_b)$ drives the shaft 39 and the shaft of the potentiometer 56. Potentiometer 56 has a reference voltage input 57 and its output containing the information $(L_b + \Delta L_b)$ is connected to the first input of a three-input adding network 58 by a cable 59. The shaft 52 is connected to the shaft 28 and connected to drive the shaft of a potentiometer 60 which has a reference voltage input 61. The output of potentiometer 60 containing the information $-(L_b - \Delta L_b)$ is connected to the second input of the adding network 58 by a cable 62 and to one input of a two-input adding network 63 by a cable 64. The output of potentiometer 56 containing the information $(L_b + \Delta L_b)$ is connected to the input of a adding network 65 by a cable 66 and the output of the adding network 65 is connected to the input of an amplifier 67 by a cable 68. The output of the amplifier 67 containing the information $-(L_b + \Delta L_b)$ is connected to input of a potentiometer 69 by a cable 70 and to the other input of adding network 63 by a cable 71. The shaft of the potentiometer 69 is driven by the shaft 52 and the output of potentiometer 69 in cable 72 contains the information $-(L_b{}^2 - \Delta L_b{}^2)$. A portion of the output of the amplifier 67 is connected to the adding network 65 for stabilization purposes. The output of adding network 63 is connected to an amplifier 74 by a cable 75 and the output of the amplifier 74 is connected to the input of a cosine resolver 76 by a cable 77. The amplitude of the quantity being resolved in the resolver 76 is fed back to the network 63. A driving device 78 turns a shaft 79 in direct proportion to the input quantity $B_b$ and the shaft 79 is connected to one input shaft of a differential 80. The other input shaft to the differential 80 is connected to a shaft 81 which displaces in direct proportion to the quantity $B_p$, the instrumentation of the shaft 81 being disclosed later. The differential output shaft 82 of the differential 80 containing the information $B_p - B_b$ is connected to the shaft of the resolver 76. The output of the resolver 76 containing the information $L_b \cos (B_p - B_b)$ is connected to the third input of the adding network 58 by a cable 83. The output of the adding network 58 is connected to the input of an amplifier 84 by a cable 85. The output of amplifier 84 containing the information $[\Delta L_b + L_b \cos (B_p - B_b)]$ is connected to a potentiometer 86 by a cable 87 and the shaft of potentiometer 86 is driven by a connection to the shaft 3. The output of amplifier 84 is fed back to the adding network 58 for nullification purposes. The output of potentiometer 86 containing the information $$-(L_a - \Delta L)[\Delta L_b + L_b \cos (B_p - B_b)]$$

is connected to a adding network 89 by a cable 189. The output of the adding network 89 is connected to the input of an amplifier 90 by a cable 91 and the output of the amplifier 90 containing the information $$(L_a - \Delta L_a)[\Delta L_b + L_b \cos (B_p - B_b)]$$

is connected to the input of a potentiometer 92 by a cable 93. A portion of the output of amplifier 90 is fed back to the network 89 for stabilization purposes. The shaft of the potentiometer 92 is connected to the shaft 6 containing the information $(L_a + \Delta L_a)$. The output of the potentiometer 92 containing the information $$(L_a{}^2 - \Delta L_a{}^2)[\Delta L_b + L_b \cos (B_p - B_b)]$$

is connected to the other input of the adding network 40 by a cable 94. The output of the adding network 40 is connected to the input of a servo amplifier 95 by a cable 96 and the output of the servo amplifier 95 is connected to the control phase of a reversible two phase $B_p$ servomotor 97 by a cable 98. The line phase of the $B_p$ servomotor 97 is connected to a single phase voltage source 99 by a cable 100. The shaft 101 of the servomotor 97 is connected to the shaft 24 of the resolver 22 and to the input shaft 102 of a differential 103. The other input to differential 103 is a shaft 104 which is turned by a driving device 105 in direct proportion to the input quantity $B_a$. The differential shaft 106 of the differential 103 is connected to the shaft 81. The shaft 101 of the servomotor 97 will seek an equilibrium quiescent position until the two inputs to the network 40 total to zero. At such time, the shaft 101 will be displaced in direct proportion to the quantity $(B_p - B_a)$ and the shafts 106 and 81 will be displaced in proportion to the quantity $B_p$.

The input of a potentiometer 110 is connected to the output of the amplifier 20 containing the information $-(L_a + \Delta L_a)$ by a cable 111. The shaft of the potentiometer 110 is connected and driven by the shaft 3. The output of the potentiometer 110 containing the information $-(L_a{}^2 - \Delta L_a{}^2)$, which is equal to $-N$ by Equation 12, is connected to one input of an adding network 120 by a cable 121. The other input to the adding network 120 is connected to the cable 72 containing the information $-(L_b{}^2 - \Delta L_b{}^2)$, which is equal to $-N_2$ by Equation 14. The output of the adding network 120 is connected to the input of an amplifier 122 by a cable 123. The output of the amplifier 122 containing the information $(N_1 + N_2)$ is connected to the input of a sine-cosine resolver 124 by a cable 125, the shaft of the sine-cosine resolver 124 being driven by the shaft 106 containing the information $B_p$. One output of the resolver 124 containing the information $(N_1 + N_2) \times (\sin B_p)$ is connected to one input of an adding network 126 by a cable 127 and the other output containing the information $(N_1 + N_2) \cos B_p$ is connected to one input of an adding network 128 by a cable 129. A portion of the output of the resolver 124 is fed back to the network 120 for stabilization purposes.

The output of the amplifier 84 containing the information $-[\Delta L_b + L_b \cos (B_p - B_b)]$ is connected to the first input of a four input adding network 130 by a cable 131. The output of the amplifier 20 containing the information $-(L_a + \Delta L_a)$ is connected to the second input of the adding network 130 by a cable 132 connected to cable 111. The output of the resolver 22 containing the information $-L_a \cos (B_p - B_a)$ is connected to the third input of network 130 by a cable 133. The output of the potentiometer 13 containing the information $(L_a - \Delta L_a)$ is connected to the fourth input of adding network 130 by a cable 134. The output of the adding network 130 is connected to an amplifier 135 by a cable 136. The output of amplifier 135 containing the information $[\Delta L_a + L_a \cos (B_p - B_a)] + [\Delta L_b + L_b \cos (B_p - B_b)]$, which is equal to $\frac{1}{2}(D_1 + D_2)$ by Equations 11 and 13, is connected to a network 137 by a cable 138. A portion of the output of amplifier 135 is fed back to network 130 for stabilization purposes. The output of adding network 137 is connected to the input of an amplifier 139 by a cable 140 and the output of the amplifier 139 is connected to one input of a potentiometer 190 by a cable 141 and to one input of a potentiometer 142 by a cable 143. A portion of the output of amplifier 139 is fed back to adding network 137 for stabilization purposes. The other input of potentiometer 190 is connected to the output of amplifier 135 by a cable 144 and the other input of the potentiometer 142 is connected to the output of amplifier 135 by a cable 145. The output of potentiometer 190 is connected to the other input of the network 126 and the output of potentiometer 142 is connected to the other input of the network 128. The differential output of network 126 is connected to a servo amplifier 150 by a cable 151 and the output of servoamplifier 150 is connected to a servomotor 152 by a cable 153. The shaft 154 of the servomotor 152 is connected to drive an output device 155 and the shaft of the potentiometer 190. The servomotor shaft 154 will seek an equilibrium position until the two inputs to the adding network 126 cancel each other. At the quiescent condition, the equation $$X_p = \left(\frac{N_1 + N_2}{D_1 + D_2}\right) \sin B_p$$

will be satisfied and the servomotor shaft 154 will be displaced in direct proportion to the desired $X_p$ quantity.

The output of adding network 128 is connected to a servo amplifier 160 by a cable 161 and the output of servo-amplifier 160 is connected to a servomotor 162 by a cable 163. The shaft 164 of the servomotor 162 is connected to drive an output device 165 and the shaft of the potentiometer 142. The servomotor shaft 164 will seek an equlibrium position until the two inputs to the differential network 128 cancel each other. At the quiescent condition, the equation $$Y_p = \left(\frac{N_1+N_2}{D_1+D_2}\right) \cos B_p$$

will be satisfied and the servomotor shaft 164 will be displaced in direct proportion to the desired $Y_p$ quantity.

It is to be understood that various modifications of the invention other than those above described may be effected by persons skilled in the art without departing from the principle and scope of the invention as defined in the appended claims.

What is claimed is:

1. An analog computation device for converting phase hyperbolic coordinates to plane rectangular coordinates comprising means for continuously mechanizing and solving equations having the basic form:

$$X_p = \left(\frac{N_1+N_2}{D_1+D_2}\right) \sin B_p$$

and $$Y_p = \left(\frac{N_1+N_2}{D_1+D_2}\right) \cos B_p$$

to obtain continuously the quantities $X_p$ and $Y_p$ which are related to: three reference points A, C and B having base lines $L_a$ and $L_b$, $L_a$ being measured from C to A and $L_b$ being measured from C to B, a rectangular coordinate system having an X axis and a Y axis with their origin at the said point C, the bearing of the said base line $L_a$ being $B_a$ and the bearing of the said base line $L_b$ being $B_b$ as measured from the Y axis, and a point P having hyperbolic coordinates $\Delta L_a$ and $\Delta L_b$ relative to the said reference points A, C and B and rectangular coordinates $X_p$ and $Y_p$ relative to the said X and Y axes, the point P having a polar bearing $B_p$ as measured from the Y axis, wherein $N_1$ is equal to the computation quantity $(L_a^2-\Delta L_a^2)$, $N_2$ is equal to the computation quantity $(L_b^2-\Delta L_b^2)$, $D_1$ is equal to the computation quantity $2[\Delta L_a+L_a \cos (B_p-B_a)]$ and $D_2$ is equal to the computation quantity $2[\Delta L_b+L_b \cos (B_p-B_b)]$ and the said means for mechanizing comprising means for continuously mechanizing and solving the said equations includes first means for generating quantities proportional to the observed quantities $L_a$, $(L_a-\Delta L_a)$, $L_b$ and $(L_b-\Delta L_b)$, first means responsive to said generating means for computing the quantity $(N_1+N_2)$, second means for generating quantities proportional to the observed quantities $B_b$ and $B_a$, second means responsive to said first and second generating means for computing the quantity $B_p$, third means responsive to said first and second generating means and said second computing means for computing a quantity $(D_1+D_2)$, resolving means connected to said $(N_1+N_2)$ and $B_p$ computing means for obtaining a first resolved output quantity $(N_1+N_2) \sin B_p$ and a second resolved output quantity $(N_1+N_2) \cos B_p$, means connected to said resolving means to receive the first resolved output quantity and to said $(D_1+D_2)$ computing means for obtaining the coordinate quantity $X_p$ and means connected to said resolving means to receive the second resolved output quantity and to said $(D_1+D_2)$ computing means for obtaining the coordinate quantity $Y_p$.

2. An analog computation device as claimed in claim 1 wherein the said means connected to said resolving means to receive the first resolved output quantity and to said $(D_1+D_2)$ computation means for obtaining the coordinate quantity $X_p$ includes a closed loop servomechanism system having a potentiometer connected to said $(D_1+D_2)$ computing means, a differential network connected to the output side of said potentiometer and to said resolving means to receive the said first resolved output quantity, a servoamplifier driven by the output of the said differential network and an electric motor having an output shaft, said motor being driven by the servo amplifier and said output shaft being in driving connection with the said potentiometer, whereby the displacement of the motor shaft is directly proportional to the coordinate quantity $X_p$.

3. An analog computation device as claimed in claim 2 wherein the said means connected to said resolving means to receive the second resolved output quantity and to said $(D_1+D_2)$ computation means for obtaining the coordinate quantity $Y_p$ includes a second closed loop servomechanism system having a second potentiometer connected to said $(D_1+D_2)$ computing means, a second differential network connected to the output side of said second potentiometer and to the said resolving means to receive the said second resolver output quantity, a second servoamplifier driven by the output of the said second differential network and a second electric motor having an output shaft said second motor being driven by the said second servoamplifier and the said output shaft of the said second motor being in driving connection with the said second potentiometer, whereby the displacement of the motor shaft is directly proportional to the coordinate quantity $Y_p$.

References Cited in the file of this patent

UNITED STATES PATENTS

| | | |
|---|---|---|
| 2,771,243 | Wolin et al. | Nov. 20, 1956 |
| 2,844,313 | Seliger | July 22, 1958 |

OTHER REFERENCES

Electronic Analog Computers, 2nd edition (Korn and Korn), published by McGraw-Hill Book Co., 1956, page 13. (Copy in Div. 23.)

Analog Methods in Computation and Simulation (Soroka), published by McGraw-Hill Book Co., 1954, page 2. (Copy in Div. 23.)

Servo Mechanism Practice (Ahrendt), published by McGraw-Hill Book Co., 1954, page 13. (Copy in Div. 23.)